United States Patent [19]
Bowden

[11] 4,052,091
[45] Oct. 4, 1977

[54] COUPLING DEVICE

[75] Inventor: Billy W. Bowden, Hammond, La.

[73] Assignee: T K Valve & Manufacturing, Inc., Hammond, La.

[21] Appl. No.: 548,223

[22] Filed: Feb. 10, 1975

[51] Int. Cl.² .............................................. F16L 21/02
[52] U.S. Cl. .................................... 285/305; 251/148; 285/403
[58] Field of Search ............... 285/305, 276, 316, 277, 285/403; 403/377; 251/148

[56] References Cited
U.S. PATENT DOCUMENTS

| | | | |
|---|---|---|---|
| 2,065,740 | 12/1936 | Reed | 285/276 X |
| 2,514,417 | 7/1950 | Roofe | 285/276 |
| 3,239,244 | 3/1966 | Leinfelt | 285/305 X |
| 3,365,220 | 1/1968 | Rusche | 285/305 X |
| 3,507,532 | 4/1970 | Gross et al. | 285/305 X |

FOREIGN PATENT DOCUMENTS

| | | | |
|---|---|---|---|
| 716,470 | 8/1965 | Canada | 285/276 |
| 1,310,712 | 10/1962 | France | 285/305 |
| 553,388 | 6/1932 | Germany | 285/276 |
| 651,220 | 1/1963 | Italy | 285/305 |

Primary Examiner—Thomas F. Callaghan
Attorney, Agent, or Firm—Head, Johnson & Chafin

[57] ABSTRACT

A locking means for securing pipe segments in end-to-end relationship wherein at least one pipe segment is slidably disposed within a sleeve member, and having cooperative grooves provided in the pipe segment and the sleeve member to provide an annular chamber when the pipe segments are coupled. A plurality of circular disc members having a diameter substantially equal to the sum of the depth of the grooves are inserted in the annular chamber for locking said coupling in place and providing high load capabilities with ease of coupling and uncoupling.

6 Claims, 7 Drawing Figures

COUPLING DEVICE

BACKGROUND OF THE INVENTION

1. Field of the Invention

This invention relates to means for coupling pipe segments and the like and more particularly, but not by way of limitation, to the use of a plurality of circular disc members removably inserted in cooperating grooves between the segments to be coupled for locking the said segments in coupled engagement.

2. Description of the Prior Art

Heretofore, the means for coupling pipe segments by the use of telescoping members was by locking said members in engagement by providing cooperating grooves between the telescoping members and filling those grooves with ball members as taught in the patent to Rusche, U.S. Pat. No. 3,365,220 issued Jan. 23, 1968 and entitled "JOINT FOR COUPLED PILE DRIVING MANDREL". This locking means was satisfactory in that the ball members were relatively inexpensive and easily inserted and removed from the grooves. The above locking member was also satisfactory in cases where small loads were required either in tension or compression. However, when the above coupling was subjected to high loading it was found that since the ball members made contact at the groove joints only at one point on each ball, the balls left imprints along the groove edges or the rolling surfaces of the balls became deformed thereby making removal of the balls difficult and often causing permanent damage to the grooves themselves.

A solution to one of these problems was proposed in the patent to Gross et al, U.S. Pat. No. 3,507,532 issued Apr. 21, 1970 entitled "CLOSURE MEANS". Instead of using balls for the locking members, Gross et al utilized a plurality of lock wire segments, each of which were shaped to fit the curvature and cross sectional shape of the grooves. This solution provided substantially continuous surface contact along the edges of the grooves which provided even loading and avoided the deformation or tracking problems present with the use of ball members.

However, with the Gross et al device two major problems are readily apparent. The first problem is the necessity of sliding each segment into the cooperating grooves which is much more difficult as opposed to rolling ball bearings into the grooves. Secondly, it is also apparent that the manufacturing of the lock wire segment will be relatively difficult and expensive since each application of couplings having different diameters will require lock wire segments having a matching radius or curvature.

SUMMARY OF THE INVENTION

The present invention is particularly designed and constructed for overcoming the aforementioned disadvantages by providing a locking means for coupling pipe segments and the like wherein cooperating grooves are provided in the pipe segments thereby forming an annular chamber when the pipe segments are in coupling engagement. However, in the present invention the locking members comprise a plurality of circular disc members which have diameters slightly less than the sum of the depths of the grooves forming the annular chamber, the thickness of said circular discs being very nearly equal to the width of the grooves into which they are inserted. These disc members due to their circular shape may be easily inserted into the annular chamber since they may be rolled into place like the aforementioned ball members. However, since the flat faces of the disc members will be in substantially continuous surface contact along the edges of the grooves, they will provide even loading and avoid deformation or tracking which is present with the ball members. Further, it is readily apparent that these disc members will be relatively inexpensive to manufacture since they can be made from ordinary barstock material.

Two other embodiments of the present invention teach the use of connecting adjacent circular disc members by a flexible line or wire whereby after insertion into the annular chamber said disc members may be easily removed since they are connected together in an edge-to-edge relationship. However, it is pointed out that in this arrangement said disc members cannot be rolled in place thereby requiring sliding around the annular chamber which is more difficult in installation.

DESCRIPTION OF THE DRAWINGS

Other and further advantageous features of the present invention will hereinafter more fully appear in connection with a detailed description of the drawings in which.

DESCRIPTION OF THE PREFERRED EMBODIMENT

Figure 1:
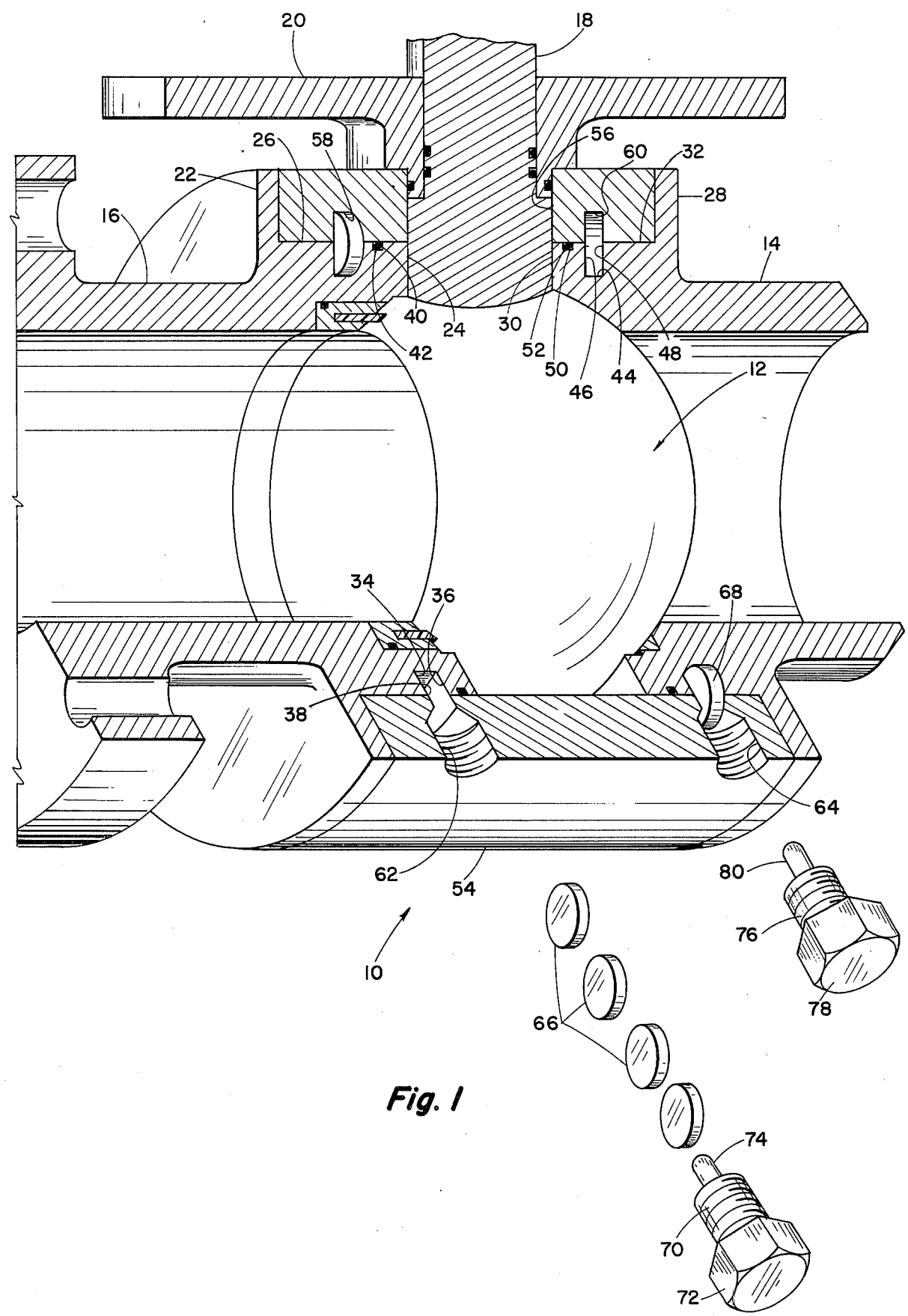
FIG. 1 is a perspective sectional view of a ball valve being connected between two pipe segments by a coupling device embodying the present invention.

Referring to the drawings in detail, and particularly to FIG. 1, reference character 10 generally indicates a coupling device for coupling a ball valve generally indicated at reference character 12 to opposing pipe-end segments 14 and 16. The typical ball valve member 12 is normally provided with an operator member 18 which extends outwardly from the pipe string in which the said valve is connected. The operator member 18 may be provided with a suitable stationary bonnet member 20 for attachment of an automatic actuator or other actuator means. The pipe segment 16 is provided with an outwardly extending flange member 22 spaced from the end of the pipe 24 thereby providing an annular end portion of the pipe designated by reference character 26.

The oppositely disclosed pipe segment 14 is likewise provided with an outwardly extending flange member 28 which is spaced from the pipe end 30 thereby providing a similar annular end portion 32.

The end portion 26 of the pipe segment 16 is provided with an annular groove 34 around the outer periphery thereof and having vertical side walls 36 and 28, said groove being spaced between the flange member 22 and the pipe end 24. A second small groove 40 is provided around the outer periphery of the pipe section 26 between the groove 34 and pipe end 24 for containing a suitable O-ring seal 42 therein.

A second annular groove 44 is provided in the end portion 32 of pipe 14 between the flange 28 and the pipe end 30, said groove 44 being provided with substantially vertical side walls 46 and 48. A second smaller groove 50 is provided around on the outer periphery of the end portion 32 betwween groove 44 and the pipe 30 for housing a suitable O-ring seal 52.

A coupling sleeve member 56 having an inside diameter substantially equal to the outside diameter of the pipe end portions 26 and 32 is provided around the outer periphery of said end portions 26 and 32. The length of sleeve member 54 is designed to be substantially equal to the distance between the flange members 22 and 28 of the pipe end segments 16 and 14 respectively. The sleeve member is provided with a suitable bore 56 for rotatably receiving the valve operator 18 therethrough.

The sleeve member 54 is also provided with a first annular groove 58 around the inner periphery thereof, said groove 58 being spaced from the end of the sleeve member 54 to coincide with the oppositely disposed groove 34 of the pipe end portion 26. The groove 58 is likewise provided with vertical side walls substantially identical to the vertical side walls 36 and 38 of the groove 34 which provides, in effect, an annular chamber made up of the cooperating grooves 34 and 58. The sleeve member 54 is further provided with a second substantially identical groove 60 around the inner periphery thereof said groove 60 being spaced from the opposite end of the sleeve member 54 to coincide with the oppositely disposed groove 44 of the pipe end portion 32. The groove member 60 is likewise provided with vertical side walls corresponding to the vertical side walls 46 and 48 of the groove 44 thereby forming a second annular chamber consisting of the aligned grooves 44 and 60.

The sleeve member 54 is provided with a threaded port 62 therethrough in communication with the annular groove 58 therein. The diameter of the port 62 will be substantially equal to the sum of the depths of the grooves 34 and 58 for a purpose that will be hereinafter set forth.

The sleeve member 54 is also provided with a second threaded port 64 through the outer periphery thereof in communication with the groove 60 therein. The diameter of the threaded port 64 will likewise be substantially equal to the sum of the depths of the grooves 44 and 60 for a purpose that will be hereinafter set forth.

The first plurality of circular disc members 66 are provided within the chamber created by the oppositely disposed grooves 34 and 58 for locking the pipe end segment 26 with respect to the sleeve member 54. The disc members 66 are constructed with a diameter slightly less than the sum of the depths of the grooves 34 and 58 and having a width slightly less than the widths of said gooves 34 and 58. The disc members 66 are inserted into the aforementioned annular chamber through the port 62 in the sleeve member 54.

A plurality of disc members 68 which are substantially identical to the disc members 66 are provided in the annular chamber formed between the grooves 44 and 60, said disc members 68 again having a diameter and width compatible with the annular chamber formed by said grooves 44 and 60. The disc members 68 are inserted into the aforementioned chamber through the port 64 in the sleeve member 54.

A first threaded plug member 70 having a standard hexagonal head member 72 at one end thereof and an outwardly extending pin member 74 at the opposite end thereof is secured within the threaded port 62 for retaining the disc members 66 therein. The pin member 74 extends into the chamber created by the grooves 34 and 58 to substantially hold the disc members 66 in place around the said chamber.

A second substantially identical threaded plug member 76 having a hexagonal operator head 78 at one end thereof and a pin member 80 at the opposite end thereof is threaded secure in the port 64, again for retaining the disc members 68 within the chamber created by the grooves 44 and 60. The pin member 80 extends into the aforementioned chamber in order to hold the disc members 68 in place within the said chamber.

For assembling the above valve installation with coupling means, the valve 12 is first connected within the sleeve member 54 as shown in FIG. 1. The pipe end segment 16 with groove 34 is then slipped into the sleeve 54 so that the flange member 22 contacts one end of the sleeve member 54 thereby aligning the groove 34 in the pipe end segment with the groove 58 in the sleeve member. Sealing between the pipe end portion 26 and the sleeve member 54 is accomplished by the O-ring seal 42. To lock the coupling in place, the plurality of disc members 66 are inserted one-at-a-time through the port 62 into the chamber formed between the grooves 34 and 58. These disc members may then be rolled through said chamber until the chamber will accept no more such disc members. The plug member 70 is then threadedly inserted in the port 62 thereby locking disc members 66 in place around the inner periphery of the chamber formed by the grooves 34 and 58.

Likewise the oppositely disposed pipe in segment 14 may be coupled to the opposite end of the sleeve member 54 in a similar manner. The end portion 32 is slipped into the sleeve member 54 to a point wherein the grooves 44 and 60 are aligned. Then the plurality of disc members 68 are inserted through the port 64 into the chamber formed by the grooves 44 and 60. When the said chamber is full, the plug member 76 is threaded secured within the port 64 thereby retaining said disc members 68 in place. Uncoupling is accomplished by reverse of the procedure hereinbefore set forth.

Figure 2:
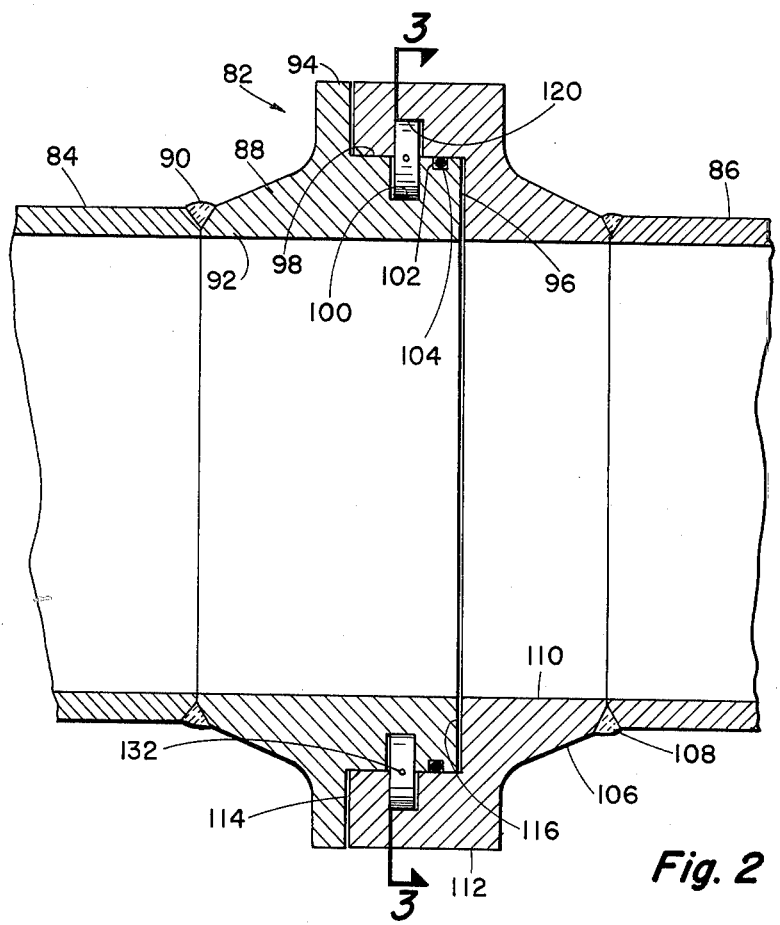
FIG. 2 is an elevational sectional view of a second pipe-end coupling device embodying the present invention.
Figure 3:
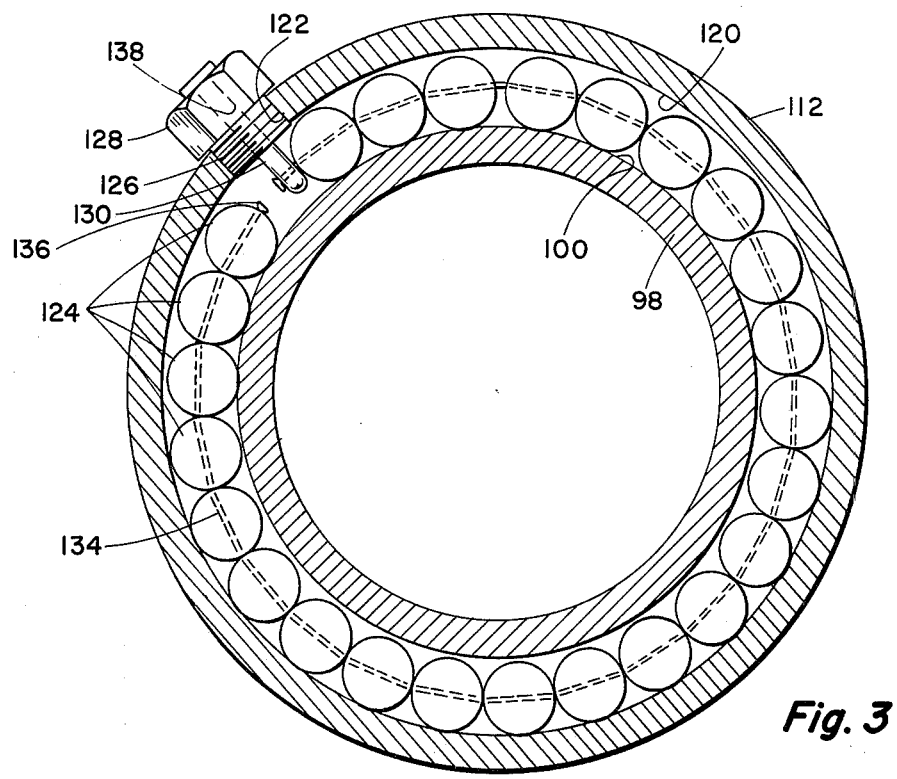
FIG. 3 is a sectional end view of the coupling of FIG. 2 taken along the broken lines 3—3 of FIG. 2.

Referring now to FIGS. 2 and 3 of the drawings, reference character 82 generally indicates a coupling device for connecting oppositely disposed pipe segments 84 and 86 together in an end-to-end relationship. This coupling arrangement is a simplified version of the coupling described in relation to FIG. 1 of the drawings.

A male coupling joint 88 is secured to the pipe end segment 84 by any suitable means such as by the weld 90 around the outer periphery of the joint. The male coupling member comprises a cylindrical body section 92 which is provided with an outwardly extending flange member 94 therearound. The flange member 94 is spaced from the male coupling member end 96 thereby providing an annular male coupling end portion 98. An annular groove 100 is provided around the outer periphery of the coupling end portion 98 and is spaced between the flange member 94 and the coupling end 96. A second smaller groove 102 is provided around the outer periphery of the end portion 98 between the groove 100 and the coupling end 96 for housing a suitable O-ring seal 104 therein.

A female coupling member 106 is secured to the pipe end 86 in any well known manner such as by suitable annular weld 108. The female coupling member 106 comprises a body portion 110 having a sleeve member portion 112 secured thereto, the interior diameter of the sleeve portion 112 being substantially identical to the outside diameter of the end portion 98 of the male coupling member 88 to receive said end portion therein. The sleeve member 112 terminates at an outer end surface 114. The joint between the interior surface of the sleeve 112 and the body member 110 forms a shoulder 116. Therefore when the male coupling member end portion 98 is fully inserted in the female sleeve member 112 the sleeve end 114 will contact the flange member 94. The male coupling end 96 also contacts the shoulder portion 116 of the female coupling member.

An annular groove 120 is provided around the inner periphery of the sleeve member 112 and is substantially identical in width and depth to the groove 100 and oppositely disposed therefrom, thereby forming an annular chamber between the male and female coupling members 88 and 106. A threaded port 122 is provided through sleeve member 112 in communication with the groove 120 therein, the diameter of said port 122 being substantially equal to the sum of the depths of the grooves 100 and 120.

A plurality of circular disc members 124 are disposed within the annular chamber defined by the grooves 100 and 120, each said circular disc member 124 having a diameter slightly less than the sum of the depths of the grooves 100 and 120. The width of each circular disc member 124 is slightly less than the width of the grooves 100 and 120.

A threaded plug member 126 having a hexagonal operator head 128 at one end thereof and a longitudinally extending pin member 130 at the opposite end thereof is secured within the threaded port 122 for retaining the disc members 124 in place within the annular chamber.

In the embodiment shown in FIGS. 2 and 3 each of the disc members 124 is provided with an edge-to-edge bore 132 therein for receiving an elongated flexible wire member 134 therethrough. The wire member 134 is terminated at one end by a flattened portion or retainer member 136, the said wire being threaded through the bores 132 of the disc members 124 thereby connecting the said plurality of disc members in an edge-to-edge relationship for purpose that will be hereinafter set forth. The opposite end of the wire member 134 is connected to the pin member 130 in any well-known manner. In this particular case the pin member 130 is rotatably disposed in a longitudinal bore 138 through the retaining plug 126.

Assembly of the coupling device shown in FIGS. 2 and 3 is accomplished by first inserting the end segment 98 of the male coupling device 88 into the sleeve member 112 of the female coupling member 106, a seal being provided therebetween by means of the O-ring seal 104. The string of circular disc members 124 attached together by the flexible line or wire 134 is inserted through the port 122 and pushed around and through the annular chamber formed by the grooves 100 and 120 whereupon the plug member 126 is threadedly secured within the port 122 thereby confining the disc members within said annular chamber, which in turn locks the coupling to prevent its being pulled apart.

To uncouple the device the plug member 126 is removed from the port 122 and the chain of disc members 124 are pulled out through the port 122 by means of the flexible line 134.

Naturally, the embodiment of connected disc members shown in FIGS. 2 and 3 would be interchangeable with the free rolling disc members 66 ad 68 described in the embodiment shown in FIG. 1. Further, the disc locking means hereinbefore described for both embodiments are adaptable to take either compression or tension loads thereby obviating the necessity of having flange members 22 and 28 in the first embodiment and the flange member 94 in the second embodiment. These flange members hereinbefore described simply serve to remove excessive compression loads and to serve as an alignment guide for the grooves in the coupling device.

Figure 4:
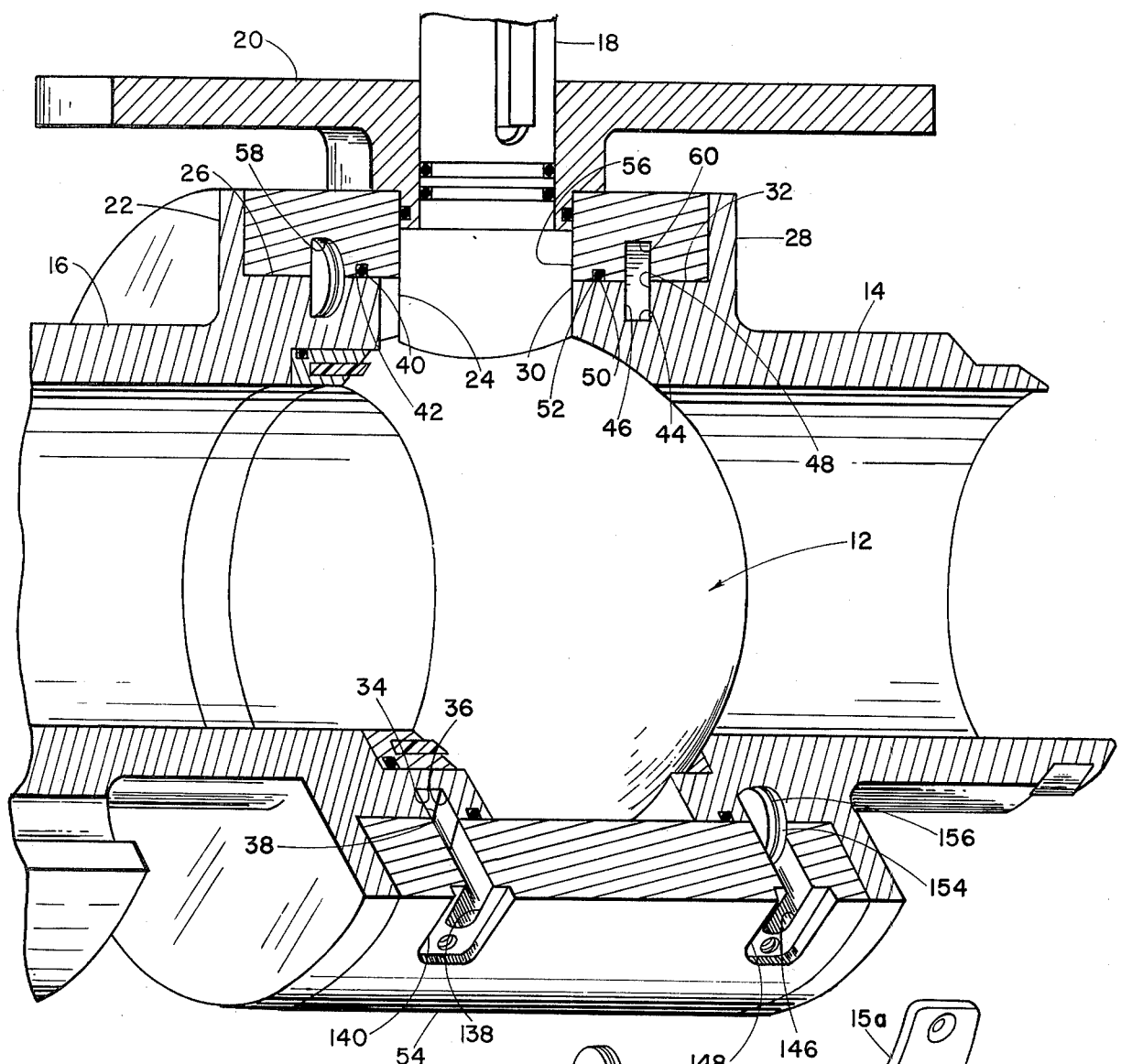
FIG. 4 is a perspective sectional view of the ball valve coupling of FIG. 1 depicting a slot aperture rather than a plug member.

Referring now to FIG. 4 of the drawings, the valve 12 and pipe segments 14 and 16 are depicted and are identical to the valve coupling members shown in FIG. 1. The primary difference between the coupling shown in FIG. 4 and that of FIG. 1 is that the coupling in FIG. 4 utilizes a slot type port instead of the threaded bores 62 and 64. Also disclosed is a second method for connecting the discs in edge-to-edge relationship.

Therefore for ease of description the same reference character numbers will be applied to the basic components of the coupling device of FIG. 4 as in that of FIG. 1.

The sleeve member 54 of FIG. 4 is provided with a first slotted aperture 138 which extends from the outer surface of the sleeve 54 through said sleeve 54 in open communication with the annular groove 58 therein. The slot therefore obviously is in communication with the channel formed between the grooves 58 and 34 when the pipe end segment 26 is fully inserted within the sleeve member 54. The outer portion of the slot 138 is provided with a recess portion 140 for receiving a retainer plate 142 therein. The retainer plate 142 may be attached to cover the slot aperture 138 and may be fastened in place by a plurality of screw members 144 as will be hereinafter set forth.

A second substantially identical slot aperture 146 is provided through the sleeve member 54 in open communication with the groove 60 therein. The sleeve member 54 is also provided with a recess portion 148 surrounding the outer portion of the slot 146 for receiving a retainer plate 150 therein, said retainer plate 150 being substantially identical to the retainer plate 142. The retainer plate 150 is held in place by a plurality of screw members 152.

Reference character 154 depicts a plurality of disc members, each being provided with a groove 156 around the outer periphery thereof for a purpose that will be hereinafter set forth. The disc members 154 are of a width substantially equal to the width of the annular grooves 34, 44, 58 and 60 and have a diameter substantially equal to the sum of the depths of the said annular grooves 34, 44, 58 and 60.

It is readily apparent that the slot type apertures described in relation to the drawings of FIG. 4 are perfectly acceptable for use with ordinary disc members 66 and 68 as shown in FIG. 1 and would likewise be acceptable for use with the joined plurality of disc members shown at FIGS. 2 and 3.

Figure 5:
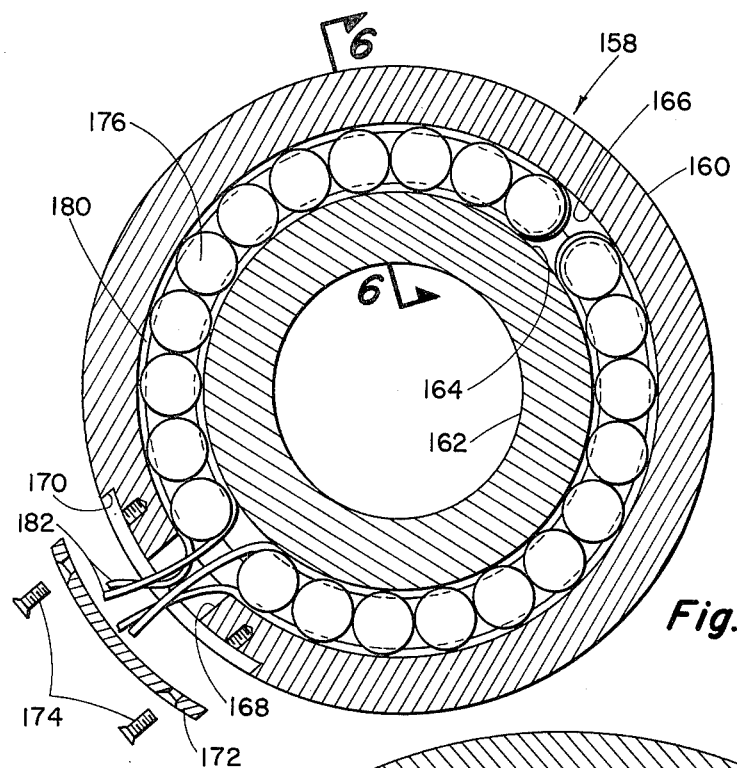
FIG. 5 is a sectional view of a coupling device having a single aperture.
Figure 6:
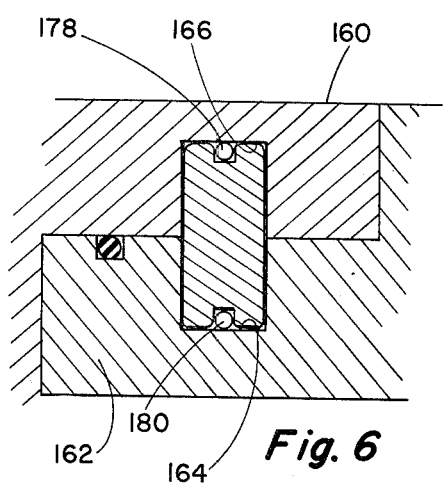
FIG. 6 is a sectional view of the coupling track of FIG. 5 taken along the broken lines 6—6 of FIG. 5.

Referring now to FIGS. 5 and 6, reference character 158 generally indicates a simple end coupling having one end member provided with a sleeve member 160, the opposite end being provided with the end segment 162. The end segment 162 is provided with annular grooves 164 around the outer periphery thereof while the sleeve member 160 is provided with an annular groove 166 around the inner periphery thereof so that when the two end segments are joined the grooves 164 and 166 are in alignment forming an interior annular chamber between the sleeve member 160 and the end segment 162. This arrangement is more clearly shown in connection with the section drawing at FIG. 6 which is taken along the broken lines 6—6 of FIG. 5.

The outer sleeve member 160 is provided with a slot aperture 168 in open communication with the interior groove 154 therearound. The outer end of the slot 168 is provided with a counter sink area 170 for receiving a retainer plate 172 therein. Said retainer plate 172 is fastened by a plurality of screws 174. The slot 168 and retainer plate 172 are substantially identical to those described in relation to the valve coupling at FIG. 4.

A plurality of disc members 176 are provided within the annular chamber formed between the grooves 164 and 166, said circular disc member 176 being substantially identical to the disc members 154. Each disc member 176 is provided with an annular groove 178 around the outer periphery thereof.

In this application the disc members 176 are divided into two groups as shown in FIG. 5, each group being provided with a flexible line such as cord or flexible metal wire 180 around the outer periphery of the entire group, said cord or wire 180 having ends 182 terminating in or about the slot aperture 168.

In operation when it is desirable to connect the end segments 160 and 162, segment 162 is inserted within the sleeve member 160 until the respective grooves 164 and 166 are in alignment, thereby forming an annular channel therein. One group of disc members are then inserted through the slot into the annular chamber, each group having a flexible line 180 therearound. The first group is pushed halfway around the annular chamber and the second group is inserted, it also being surrounded by flexible line 180 until it is in substantial contact with the first disc inserted in the first group. The end segments 182 of the flexible line may then be terminated in any suitable manner within the slot 168. To prevent any of the discs from inadvertently falling out of the coupling, the retainer plate 172 is then attached to the sleeve member 160 by means of the screws 174 in order to cover the slot 168 therein.

When it is desired to uncouple the joint, the retainer plates 172 are removed from the sleeve 160 and the groups of discs 176 are removed by simply pulling said disc out by means of the flexible lines 180.

Figure 7:
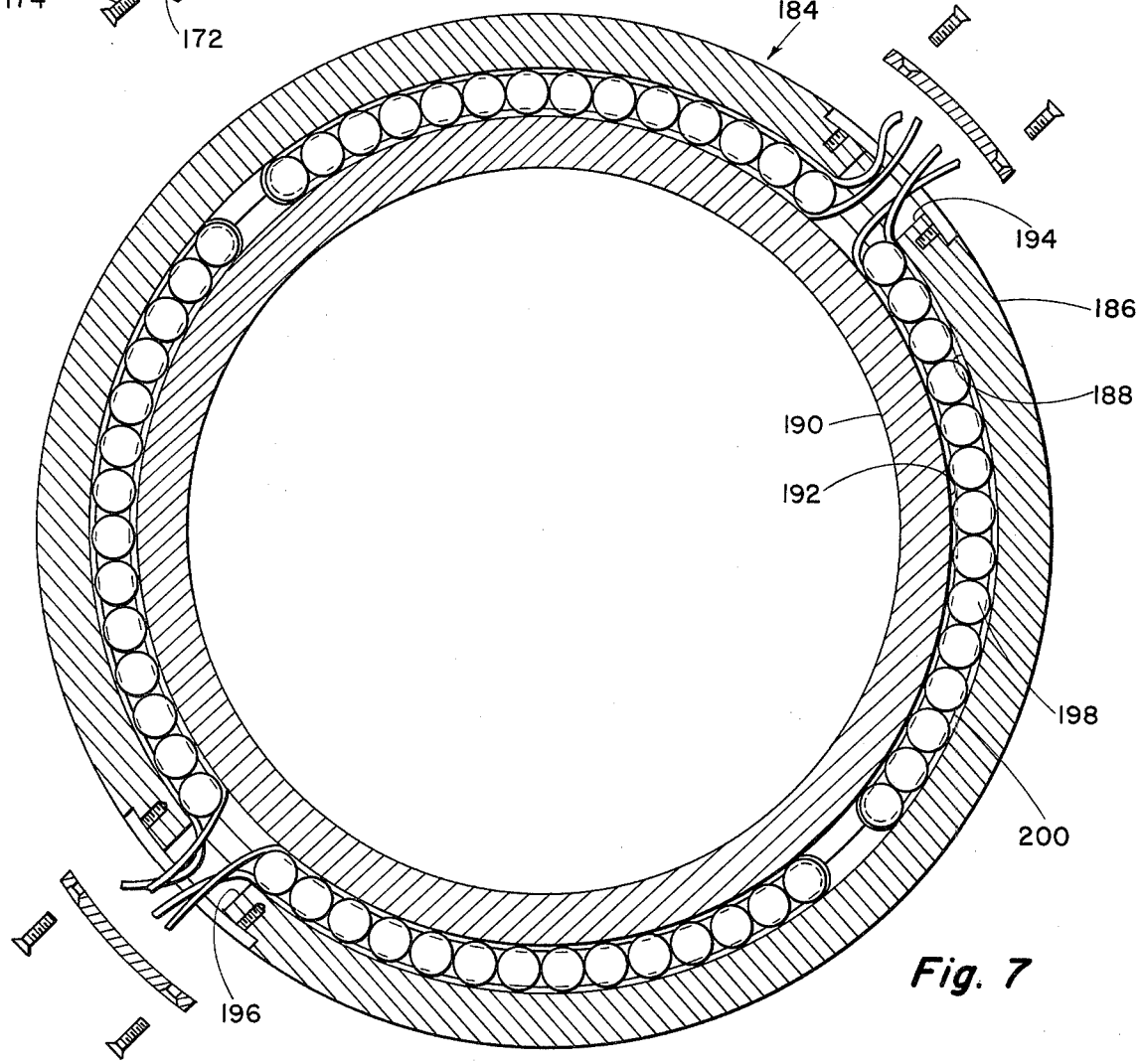
FIG. 7 is a sectional view of a coupling having two apertures.

Referring now to FIG. 7, reference character 184 depicts a coupling joint similar to that of 158 but which is larger and would represent a greater problem for installing or inserting a plurality of disc members 176. Therefore, the coupling means 184 is provided with an outer sleeve member 186 having an annular groove 188 around the inner periphery thereof, and opposite end segment 190 having an annular groove 192 around the outer periphery thereof whereby when the grooves 188 and 192 are in alignment they form an annular chamber between the sleeve member and the pipe end segment.

In this case the outer sleeve 186 is provided with a pair of slotted apertures 194 and 196 for the installation and removal of a plurality of circular disc members 198. Again, the disc members 198 are separated into groups, two groups associated with each slotted aperture. Each group of disc members 198 are held together by a flexible line 200 which is disposed around each group of disc members as hereinbefore set forth.

It is readily apparent that the coupling devices hereinbefore described can be utilized with substantially any size pipe or even solid end pieces and the outer sleeve member can be provided with as many ports as is necessary for conveniently inserting and removing the locking disc members therein.

It is further noted that the disc lock coupling means hereinbefore described in several embodiments may be utilized for joining solid mandrels, drill bits and other items apart from pipe ends as hereinbefore described.

From the foregoing it is apparent that the present invention provides a locking means for coupling joints which is economical in construction and which provides high load capabilities.

Whereas, the present invention has been described in particular relation to the drawings attached hereto, it is obvious that other and further modifications apart from those shown or suggested herein may be made within the spirit and scope of the invention.

What is claimed:

1. In a coupling device for cylindrical segments and the like having an end segment slidably disposed within a sleeve member, locking means comprising a first annular groove having parallel flat sidewalls provided around the outer periphery of the end segment, a second annular groove having parallel flat sidewalls provided around the inner periphery of the sleeve member corresponding to the first annular groove and disposed directly in alignment therewith when said end segment is fully inserted into the sleeve member, a port provided through the sleeve member in open communication with the second annular groove, a plurality of circular disc members having thickness substantially equal to the width of said first and second annular grooves and having a diameter greater than the depth of either the first or second annular groove and less than the size of the sleeve member port, said disc members being removably disposed within the aligned first and second annular grooves thereby locking said end segment in place in the sleeve member, retainer means removably inserted within said port for retaining the disc members within said annular groove and including means engaging each disc for connecting the plurality of circular disc members in an edge-to-edge relationship, said retainer means cooperating with said connecting means to keep the edges of adjacent disc members in contact with each other when installed within the annular grooves.

2. A locking means as set forth in claim 1, wherein the means for connecting the plurality of disc members comprises an edge-to-edge bore through each disc member and an elongated flexible line threaded through said bores.

3. A locking means as set forth in claim 1 wherein the means for connecting the plurality of disc members comprises an annular groove around the outer periphery of each disc member and an elongated flexible line disposed around the plurality of disc members, said flexible line being disposed within the exposed portion of the disc member annular grooves between the edges of the disc members and the annular grooves provided in the sleeve member and pipe end segment.

4. A locking means as set forth in claim 3 wherein the plurality of disc members are divided into two groups, each group having a separate flexible line therearound, the ends of the lines being terminated at the sleeve member port.

5. A locking means as set forth in claim 3 where the sleeve member is provided with a plurality of spaced ports around the outer periphery thereof and the plurality of disc members are divided into two groups for each port, each group having a separate flexible line therearound, the ends of the flexible lines terminating at the sleeve member ports.

6. In a coupling device for cylindrical segments and the like having an end segment slidably disposed within a sleeve member, locking means comprising a first annular groove having parallel flat sidewalls provided around the outer periphery of the end segment, a second annular groove having parallel flat sidewalls provided around the inner periphery of the sleeve member corresponding to the first annular groove and disposed directly in alignment therewith when said end segment is fully inserted into the sleeve member, a port provided through the sleeve member in open communication with the second annular groove, a plurality of circular disc members having thickness substantially equal to the width of said first and second annular grooves and having a diameter greater than the depth of either the first or second annular groove and less than the size of the sleeve member port, said disc members being removably disposed within the aligned first and second annular grooves thereby locking said end segment in place in the sleeve member, retainer means removably inserted with said port for retaining the disc members within said annular groove, and including means for connecting the plurality of disc members in an edge-to-edge relationship, wherein the means for connecting the plurality of disc members comprises an edge-to-edge bore through each disc member and an elongated flexible line threaded through said bores, wherein the retainer means comprises a cover member attachable to the sleeve member port, said cover member including a stop pin extending into the aligned annular grooves when said retainer means is attached to the sleeve member port and wherein one end of the flexible line is provide with stop means for preventing the discs from inadvertently becoming disconnected, the opposite end of the flexible line being connected to the stop pin whereby upon removal of the cover member with associated stop pin, the plurality of the disc members may be pulled out of the groove by means of the flexible line.

* * * * *